(12) United States Patent  
Janata et al.

(10) Patent No.: US 6,601,524 B2
(45) Date of Patent: Aug. 5, 2003

(54) TRANSLATION TABLE WITH A SPRING BIASED DOVETAIL BEARING

(75) Inventors: Douglas Janata, Rancho Santa Margarita, CA (US); Mullard A. Nunnally, Anaheim, CA (US); Michael Francisco, Rancho Santa Margarita, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 09/821,272

(22) Filed: Mar. 28, 2001

(65) Prior Publication Data

US 2002/0139283 A1 Oct. 3, 2002

(51) Int. Cl.[7] .................................................. A47B 11/00

(52) U.S. Cl. .............................. 108/143; 108/20; 108/1

(58) Field of Search ............................... 108/20, 21, 22, 108/143, 1, 2; 74/39.15, 490.09; 248/371, 397, 390, 346.05, 920, 921, 922, 923

(56) References Cited

U.S. PATENT DOCUMENTS

| 1,143,165 | A | | 6/1915 | Begusch |
| 1,306,906 | A | | 6/1919 | Jaques, Sr. |
| 2,351,386 | A | * | 6/1944 | Zucker |
| 2,367,139 | A | | 1/1945 | Ress |
| 3,357,268 | A | | 12/1967 | Richter |
| 3,442,475 | A | | 5/1969 | Rivin |
| 3,460,786 | A | | 8/1969 | Rivin |
| 3,478,608 | A | | 11/1969 | Met |
| 3,533,012 | A | | 10/1970 | Johnson et al. |
| 3,565,515 | A | | 2/1971 | De Mey, II |
| 3,577,791 | A | | 5/1971 | Vanden Broek |
| 3,578,278 | A | | 5/1971 | Pickering |
| 3,601,476 | A | | 8/1971 | MacKenzie |
| 3,620,558 | A | | 11/1971 | MacMillan |
| 3,667,525 | A | | 6/1972 | Spieth |
| 3,751,025 | A | | 8/1973 | Beery et al. |
| 3,917,201 | A | | 11/1975 | Roll |
| 3,945,246 | A | | 3/1976 | Wadensten |
| 4,030,811 | A | | 6/1977 | Khoe et al. |
| 4,065,203 | A | | 12/1977 | Goell et al. |

(List continued on next page.)

FOREIGN PATENT DOCUMENTS

| CA | 2199423 | 3/1996 |
| GB | 2 124 402 A | 7/1982 |
| GB | 2 131 971 A | 6/1984 |
| JP | 03021894 | 1/1991 |
| JP | 08088167 | 9/1994 |
| JP | 09330875 | 6/1996 |
| JP | 10144601 | 11/1996 |

OTHER PUBLICATIONS

J. M. Kahn, C. A. Burrus, and G. Raybon, High–Stability 1.5 um External–Cavity Semiconductor Lasers for Phase–Lock Applications, Photonics Technology Letters, vol. 1, No. 7, Jul. 1989.

P. Zorabedian and W. R. Trutna, Jr., "Interference–filter–tuned, alignment–stabilized, semiconductor external–cavity laser", 1988, Optical Society of America.

A. Schremer and C. L. Tang, "Single–Frequency tunable external–cavity semiconductor laser using an electro–optic birefringent modulator", Appl. Phys. Lett., vol. 55, No. 1, Jul. 3, 1989.

(List continued on next page.)

Primary Examiner—Jose V. Chen
(74) Attorney, Agent, or Firm—Irell & Manella LLP

(57) ABSTRACT

A translation table that has a spring biased dovetail bearing. The table includes a first element with a dovetail groove and a second element with a dovetail bearing located in the groove. The table further includes one or more springs that press the bearing into the groove. The spring force may be selected to eliminate lateral movement between the first and second elements while minimizing the friction of the bearing. The spring force may be varied by a screw(s) that engages the spring(s).

19 Claims, 1 Drawing Sheet

U.S. PATENT DOCUMENTS

| | | |
|---|---|---|
| 4,079,404 A | 3/1978 | Comerford et al. |
| 4,088,396 A | 5/1978 | Edelstein |
| 4,118,101 A * | 10/1978 | Teramachi |
| 4,119,363 A | 10/1978 | Camlibel et al. |
| 4,144,504 A | 3/1979 | Leggett et al. |
| 4,164,363 A | 8/1979 | Hsu |
| 4,167,744 A | 9/1979 | Nyul |
| 4,199,222 A | 4/1980 | Ikushima et al. |
| 4,237,474 A | 12/1980 | Ladany |
| 4,268,113 A | 5/1981 | Noel, Jr. |
| 4,295,152 A | 10/1981 | Khoe et al. |
| 4,296,998 A | 10/1981 | Dufft |
| 4,316,678 A | 2/1982 | F'Geppert |
| 4,332,469 A | 6/1982 | Wendland |
| 4,350,867 A | 9/1982 | Kinoshita et al. |
| 4,355,323 A | 10/1982 | Kock |
| 4,357,072 A | 11/1982 | Goodfellow et al. |
| 4,387,956 A | 6/1983 | Cline |
| 4,403,243 A | 9/1983 | Hakamada |
| 4,435,037 A | 3/1984 | Abramson et al. |
| 4,469,399 A | 9/1984 | Cowen et al. |
| 4,469,929 A | 9/1984 | Rosen et al. |
| 4,479,698 A | 10/1984 | Landis et al. |
| 4,494,720 A * | 1/1985 | Gregory et al. |
| 4,500,165 A | 2/1985 | Scholl et al. |
| 4,506,108 A | 3/1985 | Kersch et al. |
| 4,515,337 A * | 5/1985 | Torras |
| 4,523,802 A | 6/1985 | Sakaguchi et al. |
| 4,523,810 A | 6/1985 | Goss et al. |
| 4,525,659 A | 6/1985 | Imahashi et al. |
| 4,550,410 A | 10/1985 | Chenausky et al. |
| 4,615,031 A | 9/1986 | Eales et al. |
| 4,623,220 A | 11/1986 | Grabbe et al. |
| 4,647,147 A | 3/1987 | Pikulski et al. |
| 4,647,331 A | 3/1987 | Koury, Jr. et al. |
| 4,653,408 A * | 3/1987 | Nagashima et al. |
| 4,657,429 A | 4/1987 | Morris |
| 4,664,732 A | 5/1987 | Campbell et al. |
| 4,673,244 A | 6/1987 | Miles |
| 4,673,245 A | 6/1987 | Kling et al. |
| 4,677,290 A | 6/1987 | Mitch |
| 4,678,271 A | 7/1987 | Beaulieu |
| 4,679,908 A | 7/1987 | Goodwin |
| 4,701,013 A | 10/1987 | Jurczyszyn et al. |
| 4,702,556 A | 10/1987 | Ishii et al. |
| 4,706,920 A * | 11/1987 | Ojima et al. |
| 4,708,429 A | 11/1987 | Clark et al. |
| 4,714,315 A | 12/1987 | Krause |
| 4,720,163 A | 1/1988 | Goodwin et al. |
| 4,746,195 A | 5/1988 | Auracher et al. |
| 4,747,657 A | 5/1988 | Chaoui et al. |
| 4,748,632 A | 5/1988 | Preston |
| 4,759,600 A | 7/1988 | Caron et al. |
| 4,763,979 A | 8/1988 | Heywang |
| 4,767,174 A | 8/1988 | Carenco et al. |
| 4,773,730 A | 9/1988 | Sedlmayr |
| 4,779,946 A | 10/1988 | Pimpinella et al. |
| 4,779,959 A | 10/1988 | Saunders |
| 4,782,223 A | 11/1988 | Suzuki |
| 4,787,691 A | 11/1988 | Lorenzo et al. |
| 4,800,262 A | 1/1989 | Lentine |
| 4,807,750 A | 2/1989 | Ryder et al. |
| 4,823,220 A | 4/1989 | Milster et al. |
| 4,837,768 A | 6/1989 | Schmid |
| 4,842,397 A | 6/1989 | Eisler |
| 4,850,261 A | 7/1989 | Greene |
| 4,850,671 A | 7/1989 | Finzel |
| 4,854,667 A | 8/1989 | Ebata et al. |
| 4,913,527 A | 4/1990 | Jessop |
| 4,914,867 A | 4/1990 | Saito et al. |
| 4,915,482 A | 4/1990 | Collins et al. |
| 4,916,635 A | 4/1990 | Singer et al. |
| 4,938,564 A | 7/1990 | Romero |
| 4,966,474 A | 10/1990 | Geiger |
| 4,978,910 A | 12/1990 | Knox et al. |
| 4,988,159 A | 1/1991 | Turner et al. |
| 4,988,165 A | 1/1991 | Ishii et al. |
| 4,993,673 A * | 2/1991 | Hirose |
| 5,000,415 A | 3/1991 | Sandercock |
| 5,044,719 A | 9/1991 | Nakamura |
| 5,058,124 A | 10/1991 | Cameron et al. |
| 5,062,012 A | 10/1991 | Maeda et al. |
| 5,068,749 A | 11/1991 | Patel |
| 5,077,747 A | 12/1991 | Hemmer et al. |
| 5,115,354 A * | 5/1992 | Iwase |
| 5,132,824 A | 7/1992 | Patel et al. |
| 5,138,496 A | 8/1992 | Pong |
| 5,140,470 A | 8/1992 | Luecke |
| 5,146,532 A | 9/1992 | Hodge |
| 5,150,236 A | 9/1992 | Patel |
| 5,172,160 A | 12/1992 | Van Eijk et al. |
| 5,179,618 A | 1/1993 | Anton |
| 5,183,350 A | 2/1993 | Kramer |
| 5,189,725 A | 2/1993 | Bensel, III et al. |
| 5,191,587 A | 3/1993 | Hanson et al. |
| 5,194,993 A | 3/1993 | Bedzyk |
| 5,214,735 A | 5/1993 | Henneberger et al. |
| 5,218,258 A | 6/1993 | Shirasu et al. |
| 5,218,610 A | 6/1993 | Dixon |
| 5,219,051 A | 6/1993 | Davis |
| 5,251,863 A | 10/1993 | Gossman et al. |
| 5,285,995 A | 2/1994 | Gonzalez et al. |
| 5,289,559 A | 2/1994 | Wilson |
| 5,300,755 A | 4/1994 | Nishitani et al. |
| 5,311,278 A | 5/1994 | Rosencher |
| 5,319,435 A | 6/1994 | Melle et al. |
| 5,321,539 A | 6/1994 | Hirabayashi et al. |
| 5,327,061 A | 7/1994 | Gullapalli |
| 5,337,383 A | 8/1994 | DeAngelis et al. |
| 5,367,140 A | 11/1994 | Jouaneh et al. |
| 5,410,145 A | 4/1995 | Coroy |
| 5,428,225 A | 6/1995 | Silva et al. |
| 5,428,635 A | 6/1995 | Zhiglinsky et al. |
| 5,434,944 A | 7/1995 | Kerry et al. |
| 5,434,945 A | 7/1995 | Burek et al. |
| 5,446,519 A | 8/1995 | Makinouchi |
| 5,463,647 A | 10/1995 | Pan |
| 5,469,265 A | 11/1995 | Measures et al. |
| 5,499,261 A | 3/1996 | Welch et al. |
| 5,502,598 A | 3/1996 | Kimura et al. |
| 5,528,718 A | 6/1996 | Ray et al. |
| 5,530,547 A | 6/1996 | Arnold |
| 5,530,785 A | 6/1996 | Sakamoto et al. |
| 5,533,844 A * | 7/1996 | Ekleberry |
| 5,553,186 A | 9/1996 | Allen |
| 5,563,972 A | 10/1996 | Krausse et al. |
| 5,564,537 A | 10/1996 | Shoureshi |
| 5,570,444 A | 10/1996 | Janssen et al. |
| 5,581,077 A | 12/1996 | Chirovsky et al. |
| 5,598,500 A | 1/1997 | Crespel et al. |
| 5,603,387 A | 2/1997 | Beard et al. |
| 5,617,501 A | 4/1997 | Miller et al. |
| 5,619,609 A | 4/1997 | Pan et al. |
| 5,638,267 A | 6/1997 | Singhose et al. |
| 5,638,482 A | 6/1997 | Winterhoff et al. |
| 5,653,317 A | 8/1997 | Wakui |
| 5,655,045 A | 8/1997 | Morlion et al. |
| 5,660,255 A | 8/1997 | Schubert et al. |
| 5,668,906 A | 9/1997 | Yamamura et al. |
| 5,673,350 A | 9/1997 | Song et al. |
| 5,689,607 A | 11/1997 | Vincent et al. |

| | | |
|---|---|---|
| 5,717,804 A | 2/1998 | Pan et al. |
| 5,725,066 A | 3/1998 | Beard et al. |
| 5,737,132 A | 4/1998 | Luecke et al. |
| 5,745,633 A | 4/1998 | Giebel et al. |
| 5,748,821 A | 5/1998 | Schempp et al. |
| 5,751,877 A | 5/1998 | Ishizaka et al. |
| 5,757,561 A | 5/1998 | Sechrist et al. |
| 5,758,004 A | 5/1998 | Alarcon et al. |
| 5,761,360 A | 6/1998 | Grois et al. |
| 5,765,800 A | 6/1998 | Watanabe et al. |
| 5,774,614 A | 6/1998 | Gilliland et al. |
| 5,791,621 A * | 8/1998 | Yashima |
| 5,793,920 A | 8/1998 | Wilkins et al. |
| 5,793,921 A | 8/1998 | Wilkins et al. |
| 5,794,912 A | 8/1998 | Whittaker et al. |
| 5,812,958 A | 9/1998 | Mayama |
| 5,823,307 A | 10/1998 | Schubert et al. |
| 5,825,558 A | 10/1998 | Farmiga et al. |
| 5,852,519 A | 12/1998 | Do et al. |
| 5,880,894 A | 3/1999 | Blakley |
| 5,909,324 A | 6/1999 | Bryant et al. |
| 5,918,506 A * | 7/1999 | Rantanene |
| 5,930,057 A | 7/1999 | Sechrist et al. |
| 5,941,920 A | 8/1999 | Schubert |
| 5,946,023 A | 8/1999 | Blanding |
| 5,963,695 A | 10/1999 | Joyce |
| 6,016,230 A | 1/2000 | Nunnally et al. |
| 6,022,005 A | 2/2000 | Gran et al. |
| 6,196,138 B1 * | 3/2001 | Sakai et al. |
| 6,198,580 B1 | 3/2001 | Dallakian |
| 6,209,841 B1 | 4/2001 | Houghton, Jr. et al. |
| 6,327,929 B1 * | 12/2001 | Yanagisawa |

OTHER PUBLICATIONS

M. W. Maeda, J. S. Patel, D. A. Smith, Chinlon Lin, M. A. Saifi, and A. Von Lehman, "An Electronically Tunable Fiber Laser with a Liquid–Crystal Etalon Filter as the Wavelength–Tuning Element", IEEE Photonics Technology Letters, vol. 2, No. 11, Nov. 1990.

Katsuhiko Hirabayashi, Hiroyuki Tsuda, and Takashi Kurokawa, "Tunable Liquid–Crystal Fabry–Perol Interferometer Filter for Wavelength–Division Multiplexing Communication Systems", Journal of Lightwave Technology, vol. 11, No. 12, Dec. 1993.

Stephen R. Mallinson, "Wavelength–selective filters for single–mode fiber WDM systems using Fabry–Perot interferometers", Applied Optics, vol. 26, No. 3, Feb. 1, 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid–Crystal Fabry–Perot Interferometer", IEEE Photonics Technology Letters, vol. 3, No. 6. Jun. 1991.

John R. Andrews, "Low Voltage Wavelength Tuning of an External Cavity Diode Laser Using a Nematic Liquid Crystal–Containing Birefringent Filert", IEEE Photonics Technology Letters. vol. 2, No. 5, May 1990.

N. A. Olsson and J. P. Van Der Ziel, "Performance Characteristics of 1.5–um External Cavity Semiconductor Lasers for Coherent Optical Communication", Journal of Lightwave Technology, vol. LT–5. No. 4, Apr. 1987.

Hecht Optics Second Edition, Eugene Hecht, reprinted 1990, reference text, pp. 303 # 368.

Rivin, Eugene I., "Vibration isolation of precision equipment", Precision Engineering, 1995, pp. 41–56, vol. 17.

"Marsh Mellow Springs Vibration Isolation Design Manual", 1998, Firestone Industrial Products Company.

Rivin, Eugene I., "Shaped Elastomeric Components for Vibration Control Devices", Sound and Vibration, Jul. 1999, pp. 18–23, vol. 33, No. 7.

* cited by examiner

TRANSLATION TABLE WITH A SPRING BIASED DOVETAIL BEARING

BACKGROUND OF THE INVENTION

1. Field of the Invention

The present invention relates to a mechanical translation table that has a spring biased dovetail bearing.

2. Background Information

Translation tables typically have a platform that can be moved relative to a stationary substrate. The table can provide a means to accurately move one object relative to another object. For example, in optical test benches, an optical component such as a focusing mirror, lens, etc. can be attached to the sliding platform of a translation table. The platform may be attached to a micrometer that can be manipulated by an operator to vary the location of the optical component relative to the bench. The movement of the component may vary an optical characteristic such as the reflection angle, focus point, etc. of a light beam. Translator tables may also be used for manufacturing process equipment such as machines to strip optical fibers and construct fiber optic modules.

The translation table may have dovetail bearings that allow the platform to move relative to the substrate with a minimal amount of friction. Because of manufacturing tolerances the dovetail bearings may allow a small amount of undesirable lateral movement of the platform relative to the substrate. This lateral movement will reduce the accuracy of the table. If the platform supports precision equipment, or precision optical instruments, the lateral movement can adversely effect a manufacturing process, or a laboratory experiment. It would be desirable to provide a dovetail bearing assembly that does not allow lateral movement during translation of the platform.

BRIEF SUMMARY OF THE INVENTION

One embodiment of the present invention includes a first element that has a dovetail groove and a second element which has a dovetail bearing located in the dovetail groove. A spring exerts a force that presses the dovetail bearing into the groove.

DETAILED DESCRIPTION OF THE PREFERRED EMBODIMENT

In general the present invention includes a translation table that has a spring biased dovetail bearing. The table includes a first element with a dovetail groove and a second element with a dovetail bearing located in the groove. The table further includes one or more springs that press the bearing into the groove. The spring force may be selected to eliminate lateral movement between the first and second elements while minimizing the friction of the bearing. The spring force may be varied by a screw(s) that engages the spring(s).

Figure 1:
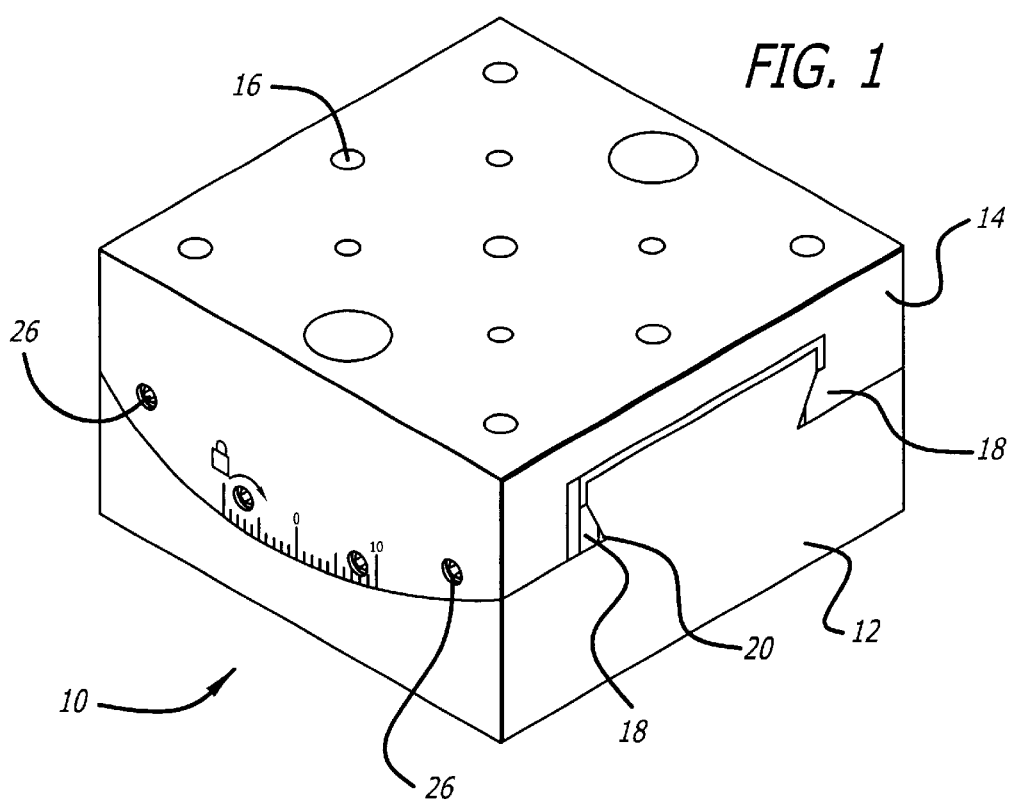
FIG. 1 is a perspective view of a translation table of the present invention.
Figure 2:
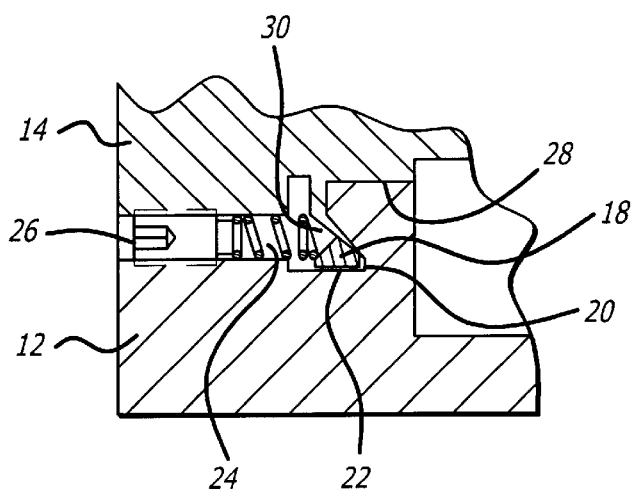
FIG. 2 is a side sectional view showing a dovetail bearing assembly of the translation table.

Referring to the drawings more particularly by reference numbers, FIGS. 1 and 2 show an embodiment of a translation table 10 of the present invention. The translation table 10 may include a first element 12 and a second element 14. The second element 14 may be a platform that can move relative to the first element 12. The second element 14 may have one or more threaded apertures 16.

The threaded apertures 16 may allow mechanical components to be attached to the second element 14. For example, an optical mounting post (not shown) may be screwed into a threaded aperture 16 and attached to the second element 14. The post can be moved relative to the first element 12 by sliding the second element 14. Although not shown, an actuator such as a micrometer can be attached to the second element 14 and manipulated to move the element 14. Alternatively, the table 10 may be incorporated into manufacturing equipment. For example, the translation table may be integrated into equipment for stripping optical fibers.

The second element 14 may have a pair of dovetail bearings 18 that slide along corresponding dovetail grooves 20 in the first element 12. The bearings 18 allow movement of the second element 14 relative to first element 12 as indicated by the arrows. The bearings 18 may have a radially shaped bottom surface 22 that creates a pivotal movement of the second element 14. Although a radial shape is shown and described, it is to be understood that the bottom surface 22 may be flat so that the second element 14 undergoes a linear movement.

The table 10 has a plurality of springs 24 that exert forces which press the dovetail bearings 18 into the grooves 20. The spring forces can be set so that the dovetail bearings 18 remain in contact with the first element 12 while minimizing the friction between the bearings 18 and the grooves 20. The table 10 may be modeled with a finite element analysis to determine the optimum spring force.

The table 10 may further have a plurality of screws 26 that can engage and vary the deflection of the springs 24. Varying the spring deflections changes the spring forces and resultant pressure exerted by the bearings 18 into the grooves 20. The screws 26 allow an operator to adjust the tension of the bearings 18.

The dovetail bearings 18 may be cantilevered from a bottom surface 28 of the second element 14 so that the springs 24 can slightly deflect the bearings 18 into the grooves 20. Each bearing 18 may include a slot 30 that seats the springs 24.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A translation table, comprising:
   a first element that has a dovetail groove;
   a second element that can move relative to said first element, said second element having a dovetail bearing that can slide along said dovetail groove;
   a spring that exerts a force onto said dovetail bearing to press said dovetail bearing into said dovetail groove; and,
   a screw that is pressed into said spring.

2. The table of claim 1, wherein said screw extends through an aperture of said second element.

3. The table of claim 1, wherein said dovetail bearing is cantilevered from a bottom surface of said second element.

4. The table of claim 1, wherein said second element has a top surface with a plurality of mounting apertures.

5. The table of claim 1, wherein dovetail bearing has a radial bottom surface located adjacent to a radial top surface of said dovetail groove.

6. The table of claim 1, wherein said dovetail bearing has a slot that seats said spring.

7. A translation table, comprising:
- a first element that has a dovetail groove that extends along a radial top surface;
- a second element that can move relative to said first element, said second element having a dovetail bearing that can slide along said dovetail groove, said dovetail bearing having a radial bottom surface that is adjacent to said radial top surface of said first element;
- a spring that exerts a force onto said dovetail bearing to press said dovetail bearing into said dovetail groove; and,
- a screw that is pressed into said spring can vary the force exerted by said spring onto said dovetail bearing.

8. The table of claim 7, wherein said screw extends through an aperture of said second element.

9. The table of claim 7, wherein said dovetail bearing is cantilevered from a bottom surface of said second element.

10. The table of claim 7, wherein said second element has a top surface with a plurality of mounting apertures.

11. The table of claim 7, wherein said dovetail bearing has a slot that seats said spring.

12. A method for adjusting a pressure of a dovetail bearing located in a dovetail groove, comprising:

varying a spring force of a spring that exerts a force onto the dovetail by turning a screw and changing a length of the spring.

13. A translation table, comprising:
- a first element that has a dovetail groove;
- a second element that can move relative to said first element, said second element having a dovetail bearing that can slide along said dovetail groove, said dovetail bearing having a slot;
- a spring that is seated in said slot of said dovetail bearing and exerts a force to press said dovetail bearing into said dovetail groove.

14. The table of claim 13, further comprising a screw that engages said spring.

15. The table of claim 13, further comprising a screw that can vary the force exerted onto said dovetail bearing.

16. The table of claim 15, wherein said screw extends through an aperture of said second event.

17. The table of claim 13, wherein said dovetail bearing is cantilevered from a bottom surface of said second element.

18. The table of claim 13, wherein said second element has a top surface with a plurality of mounting apertures.

19. The table of claim 13, wherein dovetail bearing has a radial bottom surface located adjacent to a radial surface of said dovetail groove.

* * * * *